(No Model.)
J. JONES & A. GILLIES.
BRUSH FOR STREET SWEEPERS.
No. 500,906. Patented July 4, 1893.
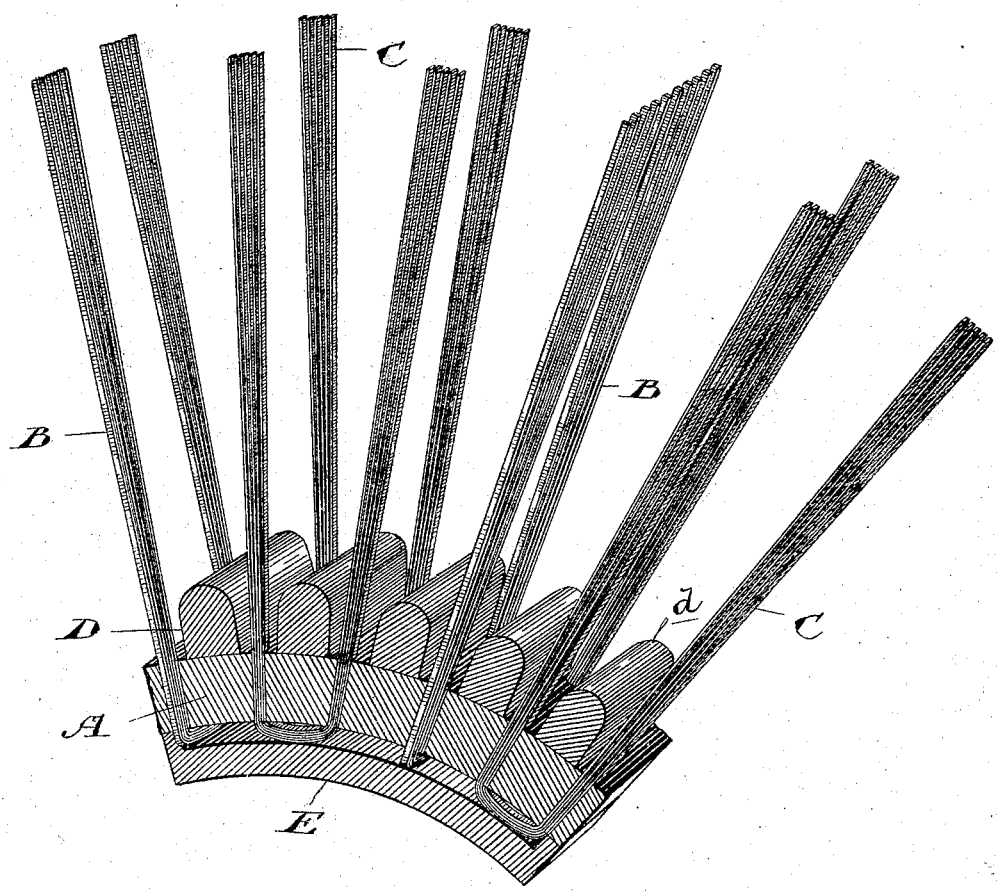
Witnesses
Inventors

UNITED STATES PATENT OFFICE.

JOHN JONES AND ALEXANDER GILLIES, OF TORONTO, CANADA.

BRUSH FOR STREET-SWEEPERS.

SPECIFICATION forming part of Letters Patent No. 500,906, dated July 4, 1893.

Application filed May 4, 1892. Serial No. 431,846. (No model.)

*To all whom it may concern:*

Be it known that we, JOHN JONES and ALEXANDER GILLIES, both of the city of Toronto, in the county of York, in the Province of Ontario, Canada, have jointly invented a certain new and Improved Street-Broom, of which the following is a specification.

The object of our invention is to construct a rotary street broom which shall act as a scraper as well as a broom to remove hardened dirt on asphalt and other pavement, and it consists, essentially, of a street broom composed of a series of steel strips bunched together and arranged in rows around a cylindrical frame, some of the strips being edgewise and other strips flatwise, substantially as hereinafter more particularly explained.

The figure on the accompanying drawing represents a section of a portion of a rotary broom constructed in accordance with our invention.

A. represents a portion of the frame of the broom which may be constructed as described in our Patent No. 471,642, or in any other suitable manner. Strips of steel B are bunched together and inserted through the portion of the frame marked A, so that their edges shall point toward the front of the broom, that is to say—in the direction that the broom revolves. We prefer to make the bunches of strips in pairs, the strips being made long enough and bent in their metal so that each end shall project through the holes made in the frame A, as indicated. The strips C, are arranged in the same manner as the strips B, but set at right angles to the strip B, so that in revolving their flat sides shall come in contact with the ground. Between each pair of the strips C, we place a block D, which acts as a support so as to strengthen the said strips. A broom constructed in this manner and caused to revolve like any ordinary rotary broom, acts as a combined scraper and sweeper. The strips B, being stiff, their ends act against the pavement like a series of scrapers loosening any hard material which may collect thereon. The strips C, being flexible act as a broom, and in this way our improved broom acts more thoroughly than a broom would if it were all flexible.

It will be observed in the drawing that the bunches of steel strips C, are bent in the middle so that the two ends point in the same direction, the said strips being inserted as indicated through the frame A. A backing E, is inserted behind the frame so as to hold the strips in position.

What we claim as our invention is—

1. A street broom, consisting of a series of steel strips bunched together and arranged in rows around a cylindrical frame, some of the strips being edge-wise and other strips flatwise; substantially as and for the purpose specified.

2. A street broom consisting of a series of steel strips bunched together and arranged in rows around a cylindrical frame, some of the strips being edge-wise and other strips flatwise, in combination with blocks D, placed between the strips; substantially as and for the purpose specified.

3. A broom, comprising a series of steel strips arranged in sets around a cylindrical frame, said sets being arranged alternately flatwise and edgewise, substantially as described.

JOHN JONES.
ALEXANDER GILLIES.

Witnesses:
E. D. ARMOUR,
A. GOMBERT.